United States Patent [19]

Tuilier et al.

[11] Patent Number: 5,867,639
[45] Date of Patent: Feb. 2, 1999

[54] METHOD FOR THE RECORDING AND READING OF A TWO-LAYER MAGNETIC TAPE, AND SYSTEM OF IMPLEMENTATION

[75] Inventors: Edmond Tuilier, Marseilles; Philippe Martin, Beaune, both of France

[73] Assignee: Kiota International, La Ciotat, France

[21] Appl. No.: 695,513

[22] Filed: Aug. 12, 1996

Related U.S. Application Data

[63] Continuation of Ser. No. 34,895, Mar. 19, 1993, abandoned.

[30] Foreign Application Priority Data

Mar. 20, 1992 [FR] France ................... 92 03388

[51] Int. Cl.⁶ .................................................. G06F 11/34
[52] U.S. Cl. .................... 395/182.04; 360/64; 365/173
[58] Field of Search ................... 371/67.1, 69.1; 235/437, 449, 450; 360/47, 64; 369/84, 94; 365/171, 173; 395/182.04, 182.03

[56] References Cited

U.S. PATENT DOCUMENTS

| | | |
|---|---|---|
| 4,114,029 | 9/1978 | Lee .......................................... 235/449 |
| 4,237,189 | 12/1980 | Deffeyes . |
| 5,157,663 | 10/1992 | Major et al. .............................. 371/9.1 |
| 5,295,258 | 3/1994 | Jewett et al. ............................. 395/575 |
| 5,343,422 | 8/1994 | Kung et al. .............................. 365/173 |

FOREIGN PATENT DOCUMENTS

| | | |
|---|---|---|
| 2220897 | 9/1990 | Japan . |
| 3025703 | 2/1991 | Japan . |
| 2186841 | 8/1987 | United Kingdom . |

*Primary Examiner*—Robert W. Beausoliel, Jr.
*Assistant Examiner*—Pierre E. Elisca
*Attorney, Agent, or Firm*—William L. Feeney; Kerkam, Stowell, Kondracki & Clarke,P.C.

[57] ABSTRACT

Data validation uses redundant storage of the data on two-layer magnetic tapes. A method and system provide data recording and reading on such magnetic tapes with a high degree of protection from errors and/or fraudulent behavior. The two-layer tape includes a first layer with a high coercive field positioned on a support and a second magnetic layer with a lower coercive field covering the first layer. Synchronous recording is done on the two layers so that all data is recorded on the second layer and some of the date is recorded on the first layer. Data on the second layer is validated upon reading by reading the data in the first layer after erasure of the second layer.

15 Claims, 4 Drawing Sheets

METHOD FOR THE RECORDING AND READING OF A TWO-LAYER MAGNETIC TAPE, AND SYSTEM OF IMPLEMENTATION

This is a continuation of application Ser. No. 08/034,895 filed Mar. 19, 1993, now abandoned.

BACKGROUND OF THE INVENTION

The invention relates to two-layer magnetic tapes and, more particularly, to a method and system that enable the recording and reading of such tapes in providing for a high degree of protection from errors and/or fraudulent behaviour.

More specifically, this high degree of protection from errors and/or fraudulent behaviour is obtained by seeing to it that it is no longer possible to modify the useful information without incurring a refusal during the reading of the modified information.

The invention shall be described with reference to a particular application to the recording and reading of magnetic labels carried on the packages of medicines. These magnetic labels are designed to record a number of information elements such as the pharmaceutical identification code (P.I.C.), the reimbursement ratio (under health insurance), the price etc. When a medicine is sold by a pharmacist, this magnetic label is read by a reader connected to a computer and the information elements read are processed by this computer to be entered into the accounts by the pharmacist and/or sent to the insurance organisation.

To prevent the consequences of errors and curb fraudulent behaviour, it is of prime importance that a medicine sold should not be entered into the accounts or be subject to a refund or reimbursement more than once.

The object of the invention, therefore, is to implement a method and a system for the recording and reading of magnetic labels that does not allow such errors and/or fraudulent behaviour.

To this effect, the invention proposes the use of a two-layer magnetic tape or label, one layer of which has a high coercive field while the other layer has a lower coercive field. The recording is done on these two layers in synchronism so as to record all the necessary information elements in the layer with a low coercive field and only a portion of these information elements, for example the price, in the layer with a high coercive field. When the label is read at the time of a sale, the information elements of the layer with a low coercive field are erased after a reading without error and the information elements of the layer with a high coercive field are read to be compared with the corresponding information elements read previously on the layer with a low coercive field. If the comparison reveals no error, then the information elements read on the layer with a low coercive field are validated in order to be entered into the accounts and/or forwarded to the refunding organisation. If the opposite is the case, they are considered to be erroneous or false, and are not taken into account.

SUMMARY OF THE INVENTION

The invention may be described as a method for recording and reading of a two-layer magnetic label or tape. The label or tape has a first magnetic layer with a high coercive field and a second magnetic layer with a coercive field lower than the field of the first layer. The second layer covers the first layer with respect to a support of the label or tape. The method includes synchronous recording, on the first and second layers, of information elements that are identical except for certain determined information elements which are not recorded on the first magnetic layer. Reading of the information elements recorded on at least the second layer is performed. The information elements recorded on the second layer are erased. The information elements recorded on the first layer are then read. A comparison is made between the information elements read on the first layer with the corresponding information elements read on the second layer. The information elements read on the second layer are validated if the comparison has not revealed any error. If an error is revealed by the comparison, the information elements are rejected as invalid.

The synchronous recording is carried out by using current pulses with a first amplitude, which first amplitude is determined so as to achieve recording on only the second magnetic layer, and by using current pulses with a second amplitude, which second amplitude is determined so as to achieve simultaneous recording of same information elements on the first and second layers. The second amplitude is greater than the first amplitude.

The invention is also a magnetic tape or label to implement the described method. The tape or label has a first magnetic layer with a high coercive field and a second magnetic layer with a coercive field lower than that of the first layer. The first and second layers have identical recordings at the same locations, except for certain determined locations in which the first layer has no recording.

The present invention may also be described as a system to implement the recording method. The system includes a recording head and an applicator for application to the recording head of bipolar current pulses having the first amplitude and the second amplitude.

The present invention may also be described as a system to implement the reading method. The system includes a first reading head for reading the information elements recorded on the second layer and an erasing head for erasing the information elements recorded on the second layer. A second reading head reads information elements recorded on the first layer after erasure of the second layer. A comparator circuit compares the corresponding information elements read in the first and second layers. The comparator circuit validates the information elements read in the second layer when there is no error detected by the comparator circuit.

BRIEF DESCRIPTION OF THE DRAWINGS

Other objects, features and advantages of the present invention shall appear from the following description of a particular exemplary embodiment of the method and of the system, said description being made with reference to the appended drawings, of which.

MORE DETAILED DESCRIPTION

Figure 1:
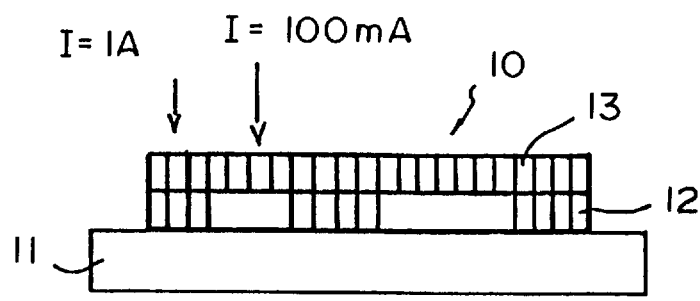
FIG. 1 shows a schematic view of a two-layer magnetic label or tape on a support.

In the different figures, the identical references designate the same elements designed for the same results. A two-layer magnetic tape or label 10, as used according to the method and in the system according to the invention, comprises, on a support 11 (FIG. 1) made of adhesive paper for example, a first magnetic layer 12 which has a high coercive field with a value of the order of several thousands of oersteds, 4000 oersteds for example. This first layer is covered with a second magnetic layer 13 having a coercive field lower than the first one, a field with a value of the order of a few hundreds of oersteds, 300 oersteds for example.

The values of the coercive fields are not of critical importance, except that they must be very different from each other, but an appropriate compromise would be a ratio of at least 10 between the values of the high field and the values of the low field.

The thicknesses of the first and second layers are not values of critical importance, but an appropriate compromise would appear to lie in a approach where the thickness of the first layer is twice that of the second layer, for example ten microns for the first layer and five microns for the second layer.

Figure 2:
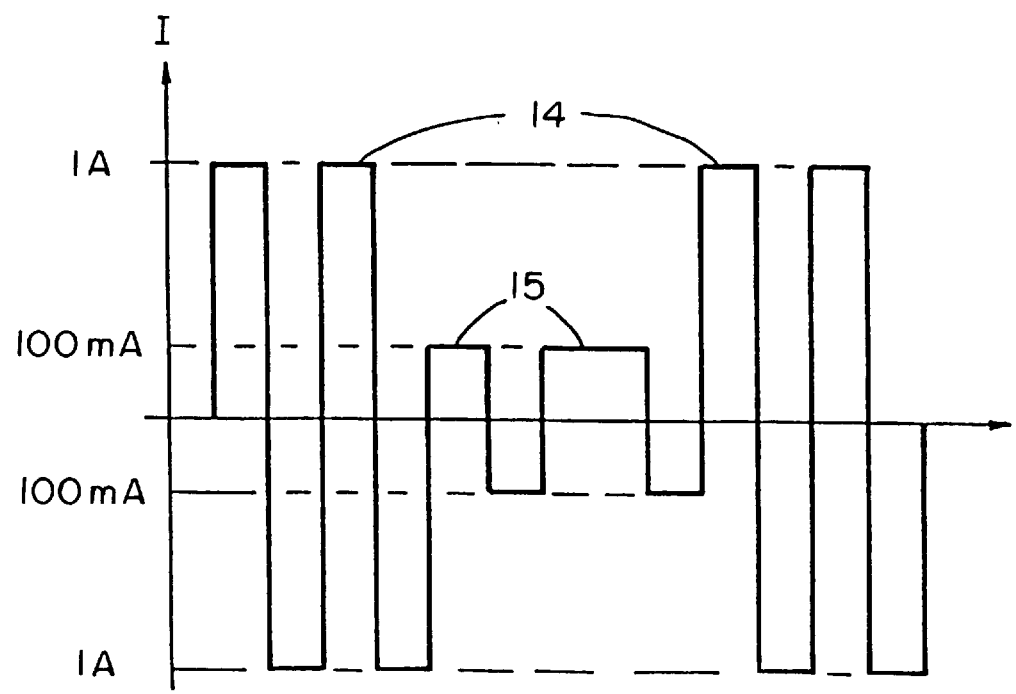
FIG. 2 is a timing diagram showing the shape and amplitude of the currents used for writing on the magnetic label or tape that is used according to the method of the invention.

According to the method of the invention, these two magnetic layers are recorded on simultaneously, in synchronism, by means of a current, the waveform and amplitude of which are shown schematically by the diagram of FIG. 2. Thus, to record information elements on the two magnetic layers 12 and 13, the currents are high-amplitude currents, with a value of one ampere for example (pulse 14) but they have lower amplitudes, for example with a value of 100 milliamperes (pulses 15), in order to record only information elements on the second magnetic layer 13. The values of the intensities of these currents are not of critical importance, but with the values chosen for the coercive fields, the ratio between the intensities should be about ten.

These current pulses, which are positive or negative depending on the binary digit to be recorded, orient the magnetic moments of each layer in a determined direction. In the different figures, the synchronism of the recording on the two layers has been depicted by lines that are aligned from one magnetic layer to the other.

According to the invention, all the information elements that are necessary are recorded on the second layer, while a part of these information elements is recorded on the first layer 12. To obtain this result, high-amplitude currents are used to record the information elements that have to be present on both layers, and low-amplitude currents have to be used to record the information elements which must be present only on the second layer.

Thus, in the case of magnetic labels for medicines, the second magnetic layer records the information elements on price, health insurance refund ratio and pharmaceutical identification code while the first magnetic layer records only the price. In this mode of recording, the result is that the first magnetic layer has "blanks" but that, when there are recordings on both layers, they are perfectly synchronised and identical in terms of significant values.

In order that the information elements recorded on the two magnetic layers may play their part in achieving the desired goal, the magnetic label such as it is recorded here above needs to be subjected to the following successive steps of:

reading the information elements on the label, i.e. the two layers 12 and 13 are read simultaneously although only the information elements of the second layer are taken into account;

erasing the information elements of the second layer 13 if the reading of this second layer has been done without error;

reading the information elements of the first layer 12 alone;

comparing the information elements read on the first layer 12 with the corresponding information elements read on the second layer 13;

validating, i.e. taking into account, the information elements read on the second layer 13 if the comparison has detected no error; if the opposite is the case, they are not taken into account.

Figure 3:
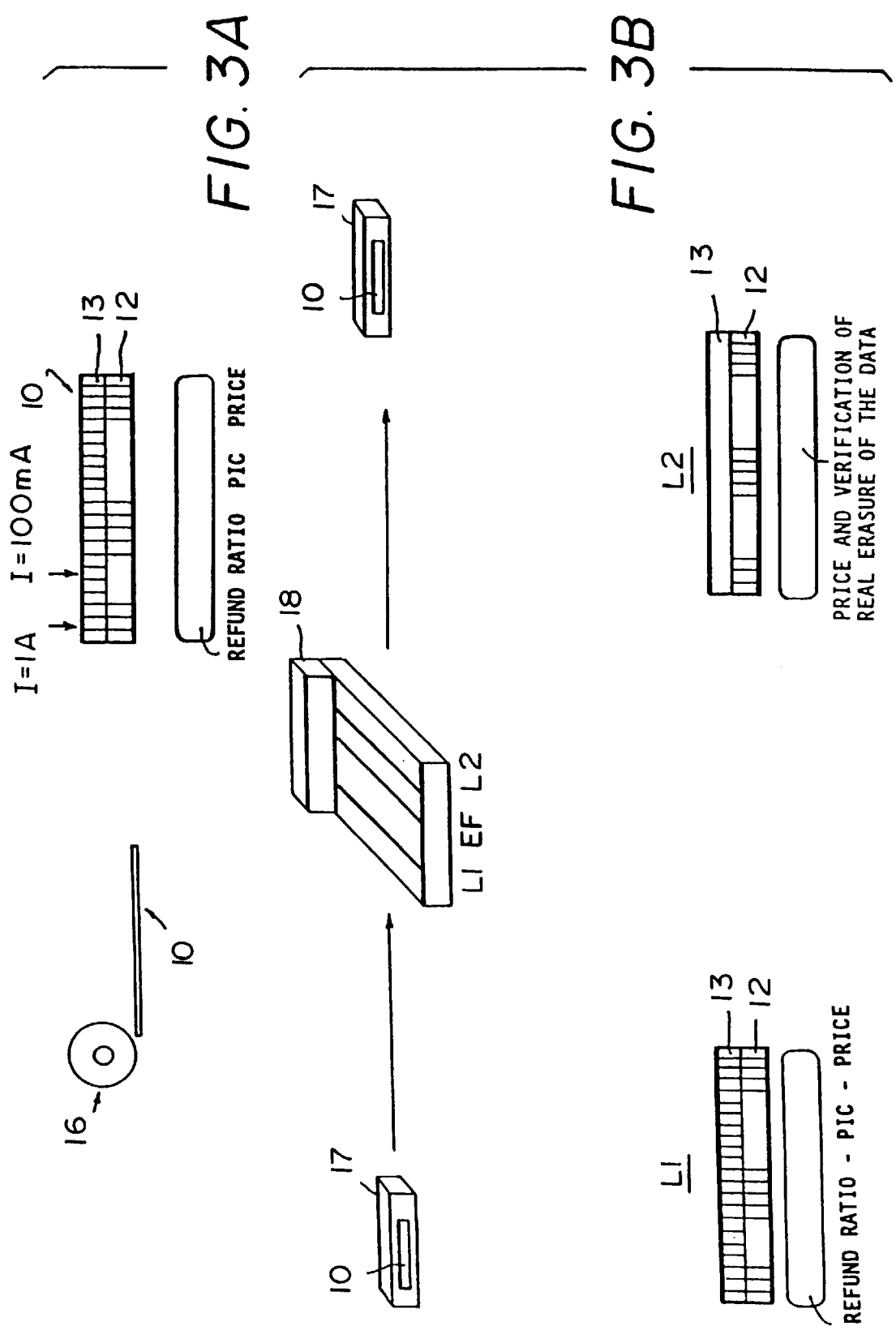
FIGS. 3A and 3B illustrate the different operations performed on the magnetic tape, and their effects on this tape.

FIG. 3A illustrates the different recording operations while FIG. 3B illustrates the different reading and erasing steps.

The recording or encoding of the two layers of the magnetic label 10 is obtained by causing the magnetic label 10 to move past a recording head 16 which is supplied with current pulses 14 and 15 illustrated by FIG. 2 so as to make a selective recording on the first layer 12 with a high coercive field. The information elements that are recorded on both layers are shown schematically in the right-hand part of FIG. 3A. The zones where there are no vertical lines on the first layer 12 are zones containing no information elements.

In FIG. 3B, the magnetic label 10, as encoded according to the process described in relation with FIG. 3A, is carried on a box 17 containing the medicine. This label is shifted in a reading table 18 which has three magnetic heads L1, EF and L2: the first head L1 for the simultaneous reading of the two magnetic layers 12 and 13 or at least the reading of the layer 13, the second head EF for the selective erasure of the second layer 13 only and the third head L2 for the reading of the first layer 12. The erasure is obtained, for example, by a direct current of 100 milliamperes applied to the magnetic head EF.

Figure 4:
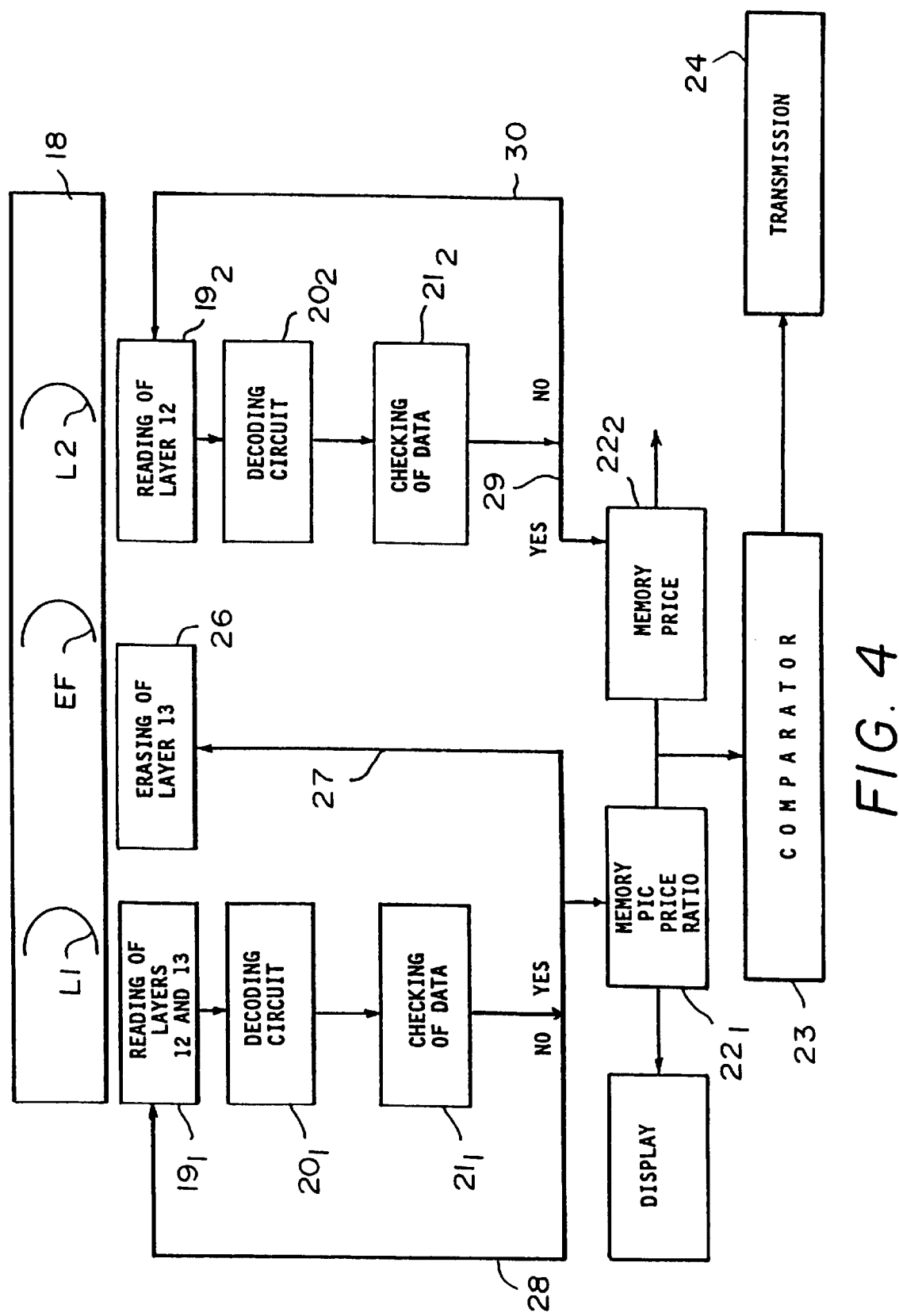
FIG. 4 is a functional drawing illustrating the system to implement the method according to the invention.

FIG. 4 illustrates the system that can be used to implement the different steps of the method during the reading of the magnetic label.

With each magnetic head L1 (or L2), there are associated a reading circuit $19_1$ (or $19_2$), a circuit $20_1$ (or $20_2$) for the decoding of the signals read, a circuit $21_1$ (or $21_2$) for checking the data elements resulting from the decoding and a memory $22_1$ (or $22_2$) for the recording of the data elements if the check has been positive. The memories $22_1$ and $22_2$ are connected at output to a comparator circuit 23 which compares the data elements contained in each memory and activates a transmission circuit 24 to transmit the contents of the memory $22_1$ when the data elements contained in the memories $22_1$ and $22_2$ are different except as regards the data elements that must be identical, such as the price in the particular exemplary embodiment. A display circuit 25 enables the display of the data elements contained in the memory $22_1$.

With the erasure head EF, there is associated an erasure circuit 26 that is activated (link 27) by the checking circuit $21_1$ so as to prompt the erasure of the second layer 13 when the reading of this layer 13 has been done without error. If the opposite is the case, the magnetic label 10 may be read once again by means of a signal that activates the reading circuit $19_1$ through the link 28. The link 27 also permits the recording of the data elements read in the memory $22_1$.

The checking circuit $21_2$ permits the recording (link 29) of the data elements read on the first layer 12 when the reading of this layer 12 has been done without error. If the opposite is the case, the magnetic head may once again be read by the head L2 (link 30).

Figure 5:
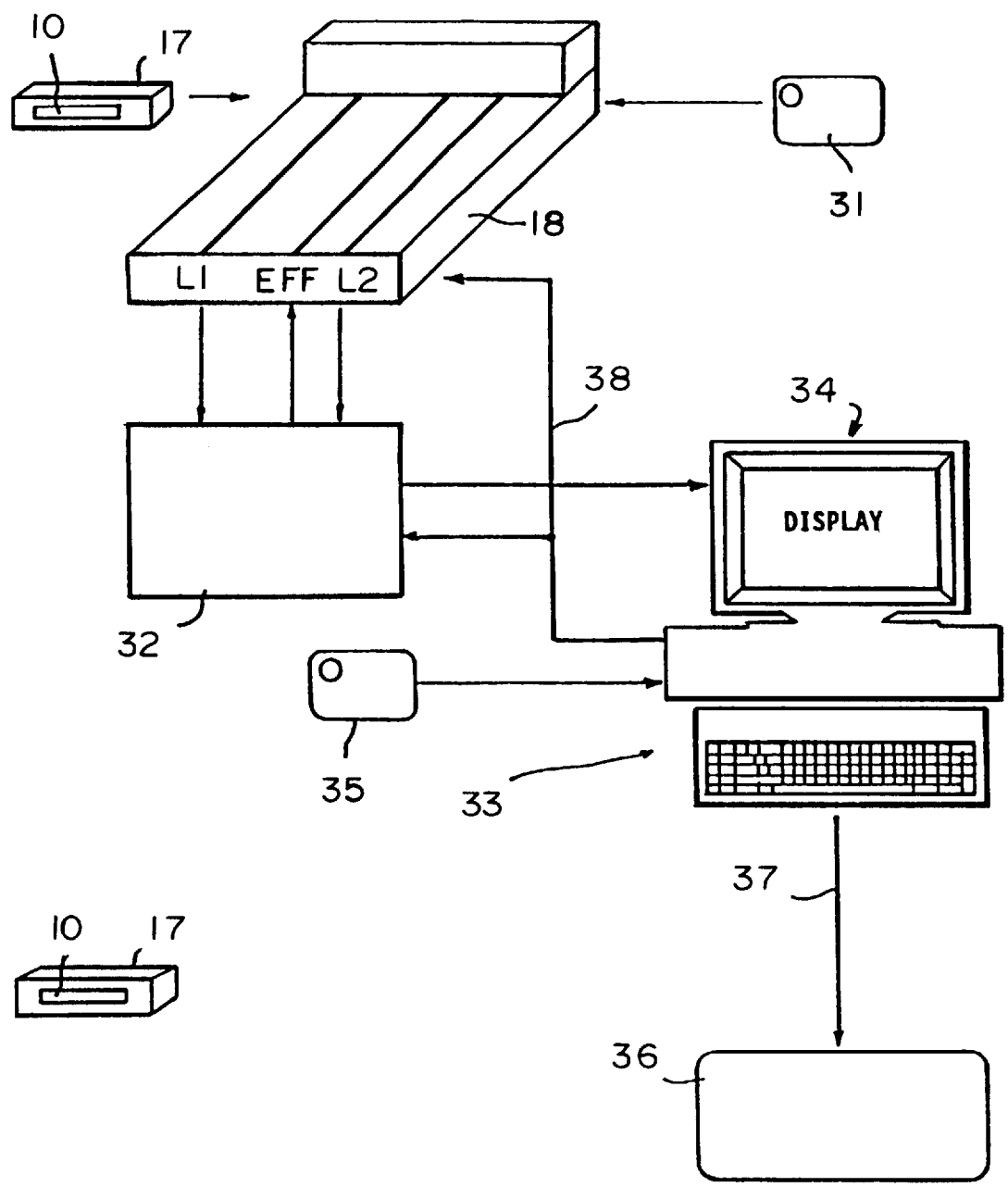
FIG. 5 is a functional diagram of a complete system for the use of a two-layer magnetic tape.

FIG. 5 is a simplified functional diagram of a system using a magnetic label 10, encoded according to the invention, that is carried by a box of medicine 17. The pharmacist who sells the medicine has a chip card 31, the data elements of which are read by the reading table 18 in such a way as to validate the working of the reading table 18. With the reading table 18, there are associated the circuits described in relation to FIG. 4, these circuits being given the general reference 32. The general circuit 32 transfers the content of the data elements from the memory 221 to a computer 33, on the screen 34 of which the data elements to be transmitted are displayed.

The information elements concerning the patient for whom the medicine is intended are contained in a chip card 35 and the information elements are, for example, read by a reader associated with the computer 33. It is all the information elements coming from the reading of the magnetic label 10 or the patient's card that are transmitted to the refunding organisation 36 or user centre on the transmission line 37.

In one variant, the pharmacist's card 31 can be read also by an operation of reading associated with the computer, and certain of the information elements contained therein may be transmitted to the refunding organisation.

Furthermore, the computer 33 may be used to control the reading table 18 which is a peripheral (link 38) of computer 33.

What is claimed is:

1. A method for the recording and reading of a two-layer magnetic label or tape comprising a first magnetic layer with a high coercive field and a second magnetic layer with a coercive field lower than that of the first layer, this second layer covering the first one with respect to a support of said magnetic label or tape, said method comprising the following steps of:

a) synchronous and simultaneous recording, on said first and second layers, of information elements that are identical by means of current pulses with a first determined amplitude, except for certain determined information elements which are recorded on only the second magnetic layer by means of current pulses with a second amplitude less than said first determined amplitude;

b) reading of the information elements recorded on said two layers of the label simultaneously;

c) erasing of the information elements recorded on said second layer after checking of said reading in the operation b) with regard to said recording of information elements on the two layers in the operation a);

d) reading of the information elements recorded on said first layer;

e) comparing of the information elements read on the first layer with the information elements read on said two layers of the label in the operation b) in order to verify the erasure of the second layer;

f) validating the information elements read on the second layer if the comparison carried out in the operation (e) shows a difference between the information elements read in the operation b) and the information elements read in the operation d); and rejecting said information elements if the comparison shows no difference.

2. A method according to claim 1, wherein the step (f) consists in activating a transmission circuit in order to transmit the information elements to a computer and in displaying said information elements.

3. A magnetic tape or label for implementing the method according to claim 2, comprising a first magnetic layer with a high coercive field and a second magnetic layer with a coercive field lower than that of said first layer, said second layer covering said first layer with respect to a support of said magnetic tape or label, wherein said first and second layers have identical recordings at the same locations, except for certain determined locations in which said first layer comprises no recording.

4. A system for implementing the recording method according to claim 2, comprising a recording head, wherein it comprises further:

means for applying to said recording head the bipolar current pulses having said first amplitude determined to record the same information elements simultaneously and synchronously on said first and second layers and said second amplitude determined to record only on said first magnetic layer.

5. A magnetic tape or label for implementing the method according to claim 1, comprising a first magnetic layer with a high coercive field and a second magnetic layer with a coercive field lower than that of said first layer, said second layer covering said first layer with respect to a support of said magnetic tape or label, wherein said first and second layers have identical and synchronous recordings at the same locations, except for certain determined locations in which said first layer comprises no recording.

6. A magnetic tape or label according to claim 5, wherein the ratio of the values between the high coercive field and the values of the low coercive field is at least 10.

7. A magnetic tape or label according to claim 5, wherein said first layer has a coercive field with a value of about 4000 oersteds while said second layer has a coercive field with a value of about 300 oersteds.

8. A system for implementing the recording method according to claim 1, comprising a recording head, wherein it comprises further:

means for applying to said recording head the bipolar current pulses having said first amplitude determined to record the same information elements simultaneously and synchronously on said first and second layers and said second amplitude determined to record only on said first magnetic layer.

9. A system for implementing the reading method according to claim 1, said system comprising:

a first reading head for reading the information elements recorded on said first and second layers, an erasing head for erasing the information elements recorded on said second layer, a second reading head for reading the information elements recorded on said first layer after erasure of said second layer, and a comparator circuit for comparing the information elements read in said first and second layers in the operation b) and the information elements read in said first layer in the operation d) and for validating the information elements read in said second layer when said comparator circuit has detected a difference between these information elements.

10. A system according to claim 9, further comprising means for the transmission of the information elements taken into account towards a computer or a user centre.

11. A system according to claim 9, wherein said first and second reading heads, said erasing head and said comparator circuit constitute a reading table on which the magnetic tape or label is shifted.

12. A system according to claim 11, wherein said reading table further comprises means for reading and interpreting the information elements contained in a first magnetic card, so as to validate the operations carried out by the reading table.

13. A system according to claim 11, wherein the system further comprises a computer, on the screen of which the information elements read on the second layer may be displayed and which is capable of reading and interpreting the information elements contained in a second magnetic card, so as to validate the information elements displayed on said screen.

14. A system according to claim 13, wherein said reading table is a peripheral unit of said computer (link 38) and wherein said computer is capable of reading and interpreting the information elements contained in said first magnetic card.

15. A method for the recording and reading of a two-layer magnetic label or tape comprising a first magnetic layer with a high coercive field and a second magnetic layer with a coercive field lower than that of the first layer, this second layer covering the first one with respect to a support of said magnetic label or tape, said method comprising the following steps of:

a) synchronous and simultaneous recording, on said first and second layers, of information elements that are identical by means of current pulses with a first determined amplitude, except for certain determined information elements which are recorded on only the second magnetic layer by means of current pulses with a second amplitude less than said first determined amplitude;

b) reading of the information elements recorded on said two layers of the label simultaneously;

c) erasing of the information elements recorded on said second layer after checking of said reading in the operation b) with regard to said recording of information elements on the two layers in the operation a);

d) reading of the information elements recorded on said first layer;

e) comparing of the information elements read on the first layer with the information elements read on said two layers of the label in the operation b) in order to verify the erasure of the second layer;

f) validating the information elements read on the second layer if the information elements read simultaneously on the first and second layers in the operation b) and the information elements read only on the first layer in the operation d) are different, except as regards the information elements that must be identical, in order to check that the erasure of the information elements recorded on the second layer in the operation c) is effective; and rejecting the information elements if the information elements read simultaneously on the first and second layers in the operation b) and the information elements read only on the first layer in the operation d) are not different, such a lack of difference being a result of a defective erasure.

* * * * *